United States Patent Office 2,804,456
Patented Aug. 27, 1957

2,804,456

STREPTOMYCIN SULFATE RESIN METATHESIS

Earl H. Pierson, Harrisonburg, Frank Verbanac, Elkton, and Edward L. Foerster and Frederick C. Boss, Harrisonburg, Va., assignors to Merck & Co., Inc., Rahway, N. J., a corporation of New Jersey No Drawing. Application June 14, 1955,
Serial No. 515,562

17 Claims. (Cl. 260—210)

This invention relates to antibiotics, and primarily to streptomycin. More particularly, this invention is concerned with a simple and economic method for producing the sulfate salt of the antibiotic from another salt of that antibiotic.

As applied to the antibiotic streptomycin, the invention is concerned with the preparation of streptomycin sulfate and dihydrostreptomycin sulfate from streptomycin calcium chloride trihydrochloride, also known as the streptomycin calcium chloride complex. The preparation of such salt of streptomycin may be effected in the manner described in U. S. Patent No. 2,446,102.

For some uses of streptomycin it is preferred to employ the streptomycin sulfate salt rather than the calcium chloride complex salt. Consequently it has been desirable to devise a simple and efficient process for converting the streptomycin calcium chloride trihydrochloride to streptomycin sulfate.

Various methods have been employed, but the methods to date have been laborious, have involved expensive reagents and have entailed significant losses. For example, previous methods of converting streptomycin calcium chloride complex to streptomycin sulfate have involved the metathesis of the calcium chloride complex with a metal sulfate. This precipitates calcium sulfate but introduces other metallic ions into the solution of streptomycin sulfate. Thus, after filtration of the calcium sulfate from solution, the filtrate must be further processed by complicated extraction and precipitation procedures to remove the interfering metal ions and chloride ions from solution. Such procedures involve a number of steps and expensive reagents. In addition, the mother liquor losses are significant since chloride ion increases the solubility of streptomycin sulfate in methanol.

Dihydrostreptomycin sulfate is a desirable form and salt of streptomycin for some uses. To make it, the calcium chloride complex is, by one process that has been used, hydrogenated to dihydrostreptomycin hydrochloride. The calcium chloride is removed from the solution by adding silver carbonate, which reacts to form the insoluble salts, calcium carbonate and silver chloride. After filtration, ammonium sulfate is added to the filtrate, thereby forming dihydrostreptomycin sulfate and ammonium chloride in solution. Methanol is then added to precipitate the dihydrostreptomycin sulfate, as with streptomycin sulfate. And like the streptomycin sulfate process, this dihydrostreptomycin process involves a number of steps and expensive reagents, and has significant mother liquor losses since the ammonium chloride increases the solubility of dihydrostreptomycin sulfate in the methanol.

We have discovered a method of converting streptomycin calcium chloride complex to streptomycin sulfate or to dihydrostreptomycin sulfate which is relatively simple and inexpensive and involves low losses.

This method involves (1) contacting a solution of streptomycin-containing material with a column of an anion exchange resin on the sulfate cycle under flow conditions that produce little, if any, precipitation of the calcium sulfate within the resin bed and (2) employing some of the streptomycin sulfate in the effluent from the column to mix with the streptomycin calcium chloride complex for the next run to precipitate a major portion of the calcium from the streptomycin calcium chloride complex as calcium sulfate, before the solution is introduced to the column of the anion exchange resin. That portion of the effluent from the column that is rich in streptomycin sulfate (referred to as the rich cut) is either (1) further processed to obtain dry streptomycin sulfate of satisfactory purity or (2) after a preliminary filtration, and without extracting the streptomycin sulfate therefrom, hydrogenated directly to produce a solution of dihydrostreptomycin sulfate, which is then processed to obtain dry dihydrostreptomycin sulfate of satisfactory purity.

In the initial run an aqueous solution of streptomycin calcium chloride complex is introduced into a closed column above the top of the resin bed. We employ as the resin material an anion exchange resin on the sulfate cycle. Preferably this resin is an organic nitrogeneous anion exchanger which derives its exchange capacity essentially from quaternary ammonium groups, and which is generally referred to as a strongly basic anion exchange resin. We particularly prefer to use the strongly basic anion exchange resin known as Amberlite IRA–400, commercially available from the Rohm & Haas Company.

The metathesis effected in the resin column during this initial run is represented by the following equation:

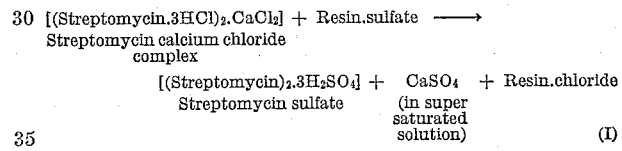

As the streptomycin-containing feed solution works its way down through the resin bed the chloride ions are replaced with sulfate ions, causing a condition of supersaturation with respect to calcium sulfate within the resin bed. If the rate of flow is not adequate to displace the supersaturated sulfate solution before crystallization takes place, the crystallization and attendant precipitation of calcium sulfate will reduce the rate of flow of the effluent to an impractical value and eventually "plug" the column.

We have found that the operation becomes a practical one when the rate of flow of the material through the column is maintained relatively constant at a level where there is little, if any, precipitation of calcium sulfate within the resin bed. The maintenance of the flow rate at the desired level may be achieved in numerous ways. In a large scale installation the maintenance of the flow rate is conveniently effected by introducing air under pressure into the top of the column so that the air exerts its pressure over the fluid above the upper level of the resin bed, the column being closed at this time so that it may operate under pressure. The rate of the flow of liquid through the resin bed is maintained at the desired level by adjusting a valve to vary the pressure of the air over the fluid level above the resin bed. In general, the air pressure at the top of the column is low at the beginning of the run and is increased as the run progresses. The maintenance of the rate of flow of the liquid through the resin bed may also be effected by a pump forcibly feeding the solution into the resin bed. This is a convenient method in a small scale installation. Still another method of maintaining the rate of flow of the liquid through the resin bed is to withdraw the effluent under a vacuum, the control of the rate of flow being achieved by regulating the degree of vacuum employed.

With the preferred resin material—Amberlite IRA–400 on the sulfate cycle—the rate of flow of the solution through the resin bed is preferably such that the superficial contact time of the solution in the resin bed is of the order of 15 to 60 minutes. The optimum range appears to be from 25 to 50 minutes. This figure is computed by dividing the volume of the resin bed by the rate of flow of the effluent. Hence, for a given resin bed, the slower the flow rate the longer is the superficial contact time.

If the flow rate of the streptomycin-containing solution through the preferred resin material falls to a point where the superficial contact time substantially exceeds 60 minutes, a precipitation of calcium sulfate within the resin bed tends to occur in significant amount, thus further impeding the flow of the solution through the resin bed. If this condition is allowed to continue without rectification, the flow of material drops to a negligible rate.

When the flow rate is maintained so that precipitation of the calcium sulfate does not occur within the resin bed, the precipitation frequently occurs shortly after the effluent leaves the column. This, however, is not objectionable, for the precipitate can then be readily removed by passing the solution and the precipitated particles contained therein, through a suitable filter.

The effluent of the resin column will vary in composition, as is well known. The first portion, or cut, consists of water which has been displaced from the resin bed. This cut is discarded. In the next portion or cut of the effluent—sometimes referred to as the "forecut"—the streptomycin sulfate in solution is relatively dilute. It is held temporarily in a suitable vessel.

The forecut is followed by a portion of the effluent in which the streptomycin sulfate is relatively concentrated and also is free of chloride ion; such portion is referred to as the "rich cut" or "converted cut." After the chloride ion first appears in the effluent (this being the indication of the "break through" of the feed into the effluent), the effluent contains a mixture of the chlorides and sulfates of streptomycin and calcium, and is referred to as the "mixed cut."

According to our invention, the rich cuts are processed to finished streptomycin sulfate or to finished dihydrostreptomycin sulfate or otherwise usefully employed, while the forecut and mixed cuts (or any one or group of them), are used as solvent for additional streptomycin calcium chloride complex in a feed make-up vessel, the streptomycin sulfate contents of the forecut and mixed cuts reacting with the streptomycin calcium chloride complex to precipitate calcium sulfate.

The reaction that takes place in the feed make-up vessel at this time may be represented by the following equation:

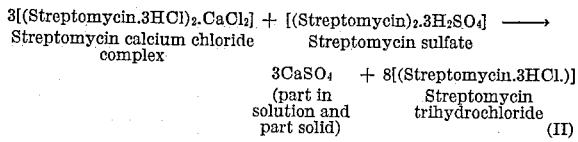

As excess streptomycin calcium chloride complex is introduced into the vessel, there is streptomycin hydrochloride and calcium chloride in solution after the foregoing Reaction II takes place.

In the meantime the ion exchange resin in the column is regenerated by conventional procedures to replace it on the sulfate cycle. The resin is preferably washed sufficiently with water after regeneration that the pH of the final wash is about 4.0.

The feed mixture in the make-up vessel, after the foregoing Reaction II has taken place, is filtered to remove the precipitated calcium sulfate, and then passed through the resin bed.

The flow of material through the resin bed is maintained relatively constant, and at such a rate that there is little, if any, precipitation of calcium sulfate within the resin bed.

During the subsequent run (and during any succeeding runs) the metathesis effected in the resin column is represented by the following equation:

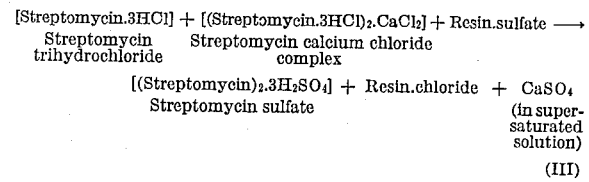

As previously described, it is important to watch the rate of flow of the effluent carefully and to take steps to maintain that flow rate.

The effluent from the bottom of the column is divided into cuts, as in the initial run. The water displacement cut is discarded. The forecut is retained for later use as liquid feed to the column or as solvent in preparing a feed solution for a subsequent run. The rich cut is run into a suitable rich cut vessel, and the mixed cut is run into another vessel, for later use in preparing a feed solution for a subsequent run.

It is preferred to operate the process to produce as high a concentration of streptomycin sulfate in the rich cut as is practicable and to operate at as high an over-all efficiency as possible. The recycling of the forecut and mixed cuts not only aids in improving efficiency by avoiding loss of those amounts of streptomycin contained therein, but also serves to eliminate from the system in a simple manner an appreciable quantity of an unwanted inorganic material (calcium), without introducing any undesired substance into the system, and so without incurring a loss of the streptomycin when such undesired substance is removed from the system (as by precipitation from a methanol solution).

To assist in securing and maintaining high concentration of streptomycin sulfate, the resin bed is preferably substantially longer than its diameter. This reduces the proportion of the dilution caused by the mixture of the feed solution with the water originally contained in the resin bed. In the preferred practice of the invention, the resin bed is of the order of 10 feet in height.

This ion exchange metathesis of streptomycin calcium chloride complex to streptomycin sulfate has been found practicable with concentrated aqueous solutions of streptomycin calcium chloride complex containing as much as 390,000 units per milliliter of streptomycin base for the initial run and containing as much as 420,000 units per milliliter of streptomycin base for subsequent runs.

In preparing finished streptomycin sulfate from the rich cut of the column, the residual calcium sulfate (i. e. that still dissolved in the aqueous solution) is precipitated by the addition of methanol to the solution, and then the solution is filtered to remove the precipitate. The filtrate is then added slowly to methanol, whereupon the streptomycin sulfate precipitates. This solution is passed through a filter or centrifuge, and the filter cake, after drying, is the finished streptomycin sulfate.

In preparing and isolating dihydrostreptomycin sulfate from the rich cut of the column, the rich cut, after filtering out such calcium sulfate as had previously precipitated, is suitably hydrogenated, using hydrogen at about 20 lbs. gauge pressure and a suitable catalyst, such as platinum oxide. After filtering to remove the catalyst, the solution is treated with methanol to precipitate the residual calcium sulfate, filtered to remove the precipitate, and then methanol and a few seed crystals added to precipitate the dihydrostreptomycin sulfate contained in the solution. This solution is then passed through a filter or centrifuge, and the filter cake, after drying, is the finished dihydrostreptomycin sulfate.

The following examples are added to illustrate the specific embodiments of the invention, but it is understood that such examples are not to be considered as limiting the invention in any way.

EXAMPLE A

Column preparation

A ten foot glass column three inches in diameter was charged with 7 liters of the anion exchange resin Amberlite IRA–400 (manufactured by Rohm & Haas Company), on the chloride cycle. The depth of the resin bed was five feet.

A 5% aqueous solution of sulfuric acid was passed down flow over the resin until the effluent from the resin was essentially free of chloride ions. The resin was then washed with forty liters of water, downflow, followed by a 4% aqueous solution of sodium hydroxide, upflow, until the effluent from the resin was essentially free of sulfate ions. The resin was water washed with forty liters of water, downflow, then washed with 5% aqueous solution of sulfuric acid, downflow, until the resin was essentially in the sulfate form. Each of these flows was at 450 milliliters per minute. The resin was then water washed, downflow, until the effluent rose to pH 2.7 and tested negative for both chloride and sulfate ions. The resin was then back-washed, allowed to settle and the water drained down to bed level.

Initial run

The feed solution was 6.58 liters of an aqueous solution of streptomycin calcium chloride complex having a concentration of about 217,500 units of streptomycin base per milliliter. This concentration is sometimes hereinafter stated as u./ml.

The feed solution was passed downflow over the resin at a rate of about 130 to 140 milliliters per minute. This provided a superficial contact time of 50 to 54 minutes. The feed solution was followed by water, at the same rate, the operation continuing until the specific gravity of the effluent returned to 1.00. A water displacement cut and seventeen numbered cuts, each about 900 milliliters, were taken, followed by a final cut of 7300 milliliters.

The water displacement cut and cuts 1 and 2 contained no streptomycin. Cuts 3 and 4 contained streptomycin in relatively dilute amounts, the concentration in cut 4 being about 105,000 u./ml. Cuts 5 through 9 were the rich cuts substantially free of chloride ion. One of these cuts had a concentration as high as about 215,000 u./ml. Pooled, they contained about 197,000 u./ml. The chloride ion "break-through," occurred in cut 10, so it and the succeeding cuts 11 through 14 were the mixed cuts. The concentration of cut 14 was very low, being about 3,600 u./ml. Cuts 15 through 18 were lower still in concentration of the streptomycin.

No hydraulic difficulties were encountered in this run, indicating that there was no significant precipitation of calcium sulfate in the resin bed, under these flow conditions, to block the flow of liquid through the bed while Reaction I, previously described, was taking place in the bed. Calcium sulfate did precipitate in samples from each of cuts 4 through 12 when each sample was left standing.

Rich cuts 5 through 9 were processed to finished streptomycin sulfate in the manner previously described, yielding an anhydrous product with a potency of 744 u./mg.

Second run

The column used for the initial run of Example A was regenerated by washing with a 7% aqueous solution of sodium sulfate (reagent grade), downflow at 460 milliliters per minute, until the effluent tested negative for chloride ions. This was followed by a water wash, downflow at 460 milliliters per minute, until the effluent tested negative for sulfate ions. The resin was then backwashed, allowed to settle and the water drained down to bed level.

The feed solution was prepared in a suitable container by combining cuts 3, 4, 10, 11, 12, 13 and 14 of the initial run, the first two cuts listed being the cuts containing streptomycin sulfate in relatively dilute concentration, and the remaining cuts listed being the mixed cuts, containing a mixture of the chlorides and sulfates of streptomycin and calcium. To these combined cuts was added 2.05 kg. of streptomycin calcium complex and sufficient water to bring the solution to 7.0 liters. Calcium sulfate thereupon precipitated, as indicated by Reaction II heretofore described. The said solution was then filtered to remove the precipitate. The filtrate had a concentration of about 254,000 units of streptomycin base per milliliter. 6.5 liters of the filtrate was passed downflow through the resin bed in the same manner and rate as in the initial run. There were no hydraulic difficulties, indicating that while Reaction III, previously described, was taking place in the resin bed, there was no significant precipitation of calcium sulfate in the resin bed, under these flow conditions, to block the flow of liquid through the bed.

A water displacement cut of 2,000 milliliters was taken, followed by six cuts of 1500 milliliters each and then two cuts (7 and 8) of 2,000 milliliters and 4,000 milliliters, respectively. Cuts 3, 4 and 5 were the rich cuts, substantially free of chloride ion, and containing, when pooled, streptomycin sulfate in the concentration of about 220,000 units of streptomycin base per milliliter. The chloride ion "break-through" occurred in cut 6, so it and cut 7 were the mixed cuts.

The rich cuts were processed to finished streptomycin sulfate in the manner previously described. The mixed cuts were held for a subsequent run.

EXAMPLE B

Column preparation

A ten foot glass column one inch in diameter was charged with 800 milliliters of the anion exchange resin Amberlite IRA–410 (manufactured by Rohm & Haas Company). The resin was placed on the sulfate cycle by washing with a 7% aqueous solution of sodium sulfate (reagent grade), upflow at 52 milliliters per minute, until the effluent showed no trace of chloride ion (by visual test with silver nitrate). The resin was then water washed, upflow at 52 milliliters per minute, until the effluent showed no trace of sulfate ion (by visual test with barium chloride). The resin was allowed to settle and the column was drained down to bed level. The settled bed depth was approximately five feet.

Initial run

The feed solution was 940 milliliters of an aqueous solution of streptomycin calcium chloride complex having a concentration of about 371,000 units of streptomycin base per milliliter. The feed solution was passed downflow over the resin at a rate of 27 milliliters per minute. This provided a superficial contact time of 29.6 minutes.

The first cut, of 500 milliliters, was essentially water displacement. The second cut, of 300 ml., was the rich cut of substantially chloride-free streptomycin sulfate, which had a potency of 366,000 u./ml. The third and fourth cuts of 800 ml. and 300 ml., respectively, were the mixed cuts.

The rich cut was processed to finished streptomycin sulfate in the manner previously described.

Second run

A duplicate column, prepared similarly as the column used in the initial run of this Example B, was charged with a feed solution in two parts. Part 1 consisted of 750 ml. of cut 3 from the initial run (having a concentration of about 303,000 u./ml.), which was passed downflow over the resin at the same rate as in the initial run. This was followed by part 2, consisting of 280 ml. of cut 4 from the initial run, to which was added 195 grams of streptomycin calcium chloride complex with a resulting concentration of about 365,000 u./ml. Calcium hydroxide was added to bring the pH of the solution up to 5.0, after which the solution was filtered to remove the insoluble calcium salts, primarily calcium sulfate. The filtrate was passed downflow over the resin at the same rate as the initial run. The first cut, of 450 ml., was essentially water displacement. The second cut, of 400 ml., was the rich cut of substantially chloride-free streptomycin sulfate, which had a potency of about 238,000 u./ml. The third cut, of 800 ml., was the mixed cut.

There were no hydraulic difficulties with either the initial or second run, indicating that calcium sulfate did not precipitate in the resin bed in any significant amount.

EXAMPLE C

Column preparation

A glass column one inch in diameter and approximately twenty feet long was charged with 1550 milliliters of anion exchange resin Amberlite IRA–400 to provide a bed depth of ten feet. The resin was regenerated with 1.0 N sulfuric acid, passed downflow at 100 ml./minute, until the chloride ion in the effluent was negligible. The resin was then water washed downflow at 140 ml./minute until the pH of the effluent had risen to about 3.1. The bed was fluidized, settled and drained to bed level.

Initial run

The feed solution was prepared by dissolving 500 grams of streptomycin calcium chloride complex in sufficient water to form 1300 ml. of solution. The pH was adjusted to 4.5 with calcium hydroxide and the solution filtered to remove insoluble salts, such as calcium carbonate, introduced as an impurity with the calcium hydroxide. 1200 ml. of the filtrate, having a concentration of about 369,500 u./ml., were passed downflow over the resin, using a micropump, run continuously, to maintain the flow at 45 ml./minute. This provided a superficial contact time of 34.5 minutes. Water was fed through the column after the feed solution was exhausted.

The first cut, of 750 ml., was essentially water displacement. The second cut, of 250 ml., contained streptomycin sulfate in a relatively dilute amount (about 166,000 u./ml.). The third cut, of 750 ml., was the rich cut of substantially chloride-free streptomycin sulfate, which had a potency of about 339,000 u./ml. The fourth and fifth cuts of 500 ml. and 250 ml., respectively, were the mixed cuts containing about 270,000 u./ml. and 68,600 u./ml., respectively.

Second run

The column used for the initial run of Example C was regenerated similarly as in that run.

The feed solution was prepared in a suitable container by combining 2, 4 and 5 of the initial run of Example C and adding 500 grams of streptomycin calcium chloride complex, adjusting the pH to 5.5 with calcium hydroxide and filtering, and adding sufficient water to the filtrate to make 1350 ml. of feed solution. This had a concentration of about 338,000 u./ml. Of this, 1300 ml. were passed downflow over the resin, using the pump as in the initial run and maintaining the same flow rate as in the initial run. Water was fed to the column when the 1300 ml. of feed solution was exhausted.

The first cut, of 750 ml., was essentially water displacement. The second cut, of 250 ml., contained streptomycin sulfate in a relatively dilute amount (about 170,400 u./ml.). The third cut, of 850 ml., was the rich cut of substantially chloride-free streptomycin sulfate, which had a potency of about 295,500 u./ml. The fourth and fifth cuts, of 500 ml. and 250 ml. respectively, were the mixed cuts containing about 238,000 u./ml. and 46,500 u./ml., respectively.

Third run

The column used for the initial and second runs of Example C was regenerated similarly as described for the initial run, except that a longer water wash was employed to bring the pH of the effluent to about 3.15. After standing overnight, the pH of the effluent from the resin bed had fallen, so the bed was further water washed to bring the pH of the effluent up to 3.0.

The feed solution was prepared in a suitable container by combining cuts 2, 4 and 5 of the second run of Example C and adding 570 grams of streptomycin calcium chloride complex, adjusting the pH to 5.5 with calcium hydroxide, and filtering. The filtered cake was washed with water and the filtrate and washes combined to bring the final solution volume to 1300 ml. with a concentration of about 415,000 u./ml. The dry cake weighed 34.1 grams.

The column was operated similarly as in the preceding runs of this Example C, using 1200 ml. of the solution as feed, followed by water.

The first cut, 750 ml., was essentially water displacement. The second cut, of 250 ml., contained streptomycin sulfate in significant concentration (about 215,000 u./ml.). The third cut, of 750 ml., was the rich cut of substantially chloride-free streptomycin sulfate, which had a potency of about 385,000 u./ml. The fourth and fifth cuts of 500 ml. and 250 ml. respectively, were the mixed cuts containing about 272,000 u./ml. and 56,300 u./ml., respectively.

Each streptomycin-containing cut of each run of this Example C was adjusted to a pH of 4.5 with calcium hydroxide.

With each of these runs of Example C there was no significant precipitation of calcium sulfate within the resin bed, the pump serving positively to maintain the rate of flow of the liquid through the resin bed at the desired level against any tendency of the flow rate to decrease as the run progressed.

EXAMPLE D

Dihydrostreptomycin sulfate

Portions of rich cuts from columns operated as described in the foregoing Examples A, B and C were hydrogenated to produce dihydrostreptomycin sulfate, the procedure employed for its preparation and isolation being that already described in this specification.

The maltol assay of the finished product, prepared from rich cuts of various runs, ranged from 1.9 to 2.5 u./mg., indicating that practically no non-hydrogenated streptomycin sulfate remained in the product. The chlorides were less than 0.1% and the sulfated ash ranged from 0.00% to 0.16%. Solutions of the product equivalent to 200,000 units of streptomycin base per milliliter were clear in all cases except one, where it was only slightly turbid. The low ash and clarity of solution were indications of the absence of any significant quantity of calcium sulfate in the product.

CONCLUSION

As evident from the above, our process is a simple and inexpensive one for converting streptomycin calcium chloride complex directly to streptomycin sulfate, in which high concentrations of the complex are employed, and high concentrations of the sulfate are obtained, without difficulty, in which there is no significant wastage or loss of streptomycin, so that the process operates at high efficiency, and in which the subsequent isolation of the streptomycin sulfate, or the subsequent direct hydrogenation of the streptomycin sulfate solution and isolation of dihydrostreptomycin sulfate, are facilitated by not having introduced products that make the isolations difficult or attended with appreciable losses.

Various changes and modifications of the invention can be made, and, to the extent that such variations incorporate the spirit of our invention, they are intended to be included within the scope of the appended claims.

What is claimed is:

1. The process which comprises maintaining an aqueous solution of streptomycin calcium chloride complex in contact with an anion exchange resin on the sulfate cycle for a superficial contact time which is insufficient to result in precipitation of calcium sulfate within the resin bed, and immediately removing the resin-treated solution from contact with the resin.

2. In the process of producing an aqueous solution of streptomycin sulfate from streptomycin calcium chloride complex, the improvement which comprises flowing an aqueous solution of streptomycin calcium chloride complex through a column of a strongly basic anion exchange resin on the sulfate cycle at a flow rate faster than the flow rate at which precipitation of calcium sulfate occurs within the resin column.

3. The process of producing an aqueous solution of streptomycin sulfate which comprises maintaining an aqueous solution of streptomycin calcium chloride complex in contact with an anion exchange resin on the sulfate cycle for a superficial contact time which is insufficient to result in precipitation of calcium sulfate within the resin bed, immediately removing the resin-treated solution from contact with the resin, precipitating calcium sulfate from the resin-treated solution after it is no longer in contact with the resin, and then removing the precipitated calcium sulfate from the resin-treated solution, leaving streptomycin sulfate as a component of the resulting solution.

4. The process which comprises feeding an aqueous solution of streptomycin calcium chloride complex having a concentration of from about 175,000 to about 450,000 units of streptomycin base per milliliter through a column of a strongly basic anion exchange resin on the sulfate cycle, maintaining the flow rate of the solution through the resin bed substantially uniform at a level where calcium sulfate does not precipitate within the resin bed, recovering the effluent which contains streptomycin sulfate and calcium sulfate, and thereafter precipitating and removing the calcium sulfate.

5. The process as defined in claim 4 wherein the level of the flow rate which is maintained provides a superficial contact time of the solution with the resin of from about 15 to 60 minutes.

6. The process of producing anhydrous streptomycin sulfate which comprises passing an aqueous solution of streptomycin calcium chloride complex through a column of a strongly basic anion exchange resin on the sulfate cycle, thereby replacing the chloride ions in the solution with sulfate ions and creating a condition of supersaturation in the solution with respect to calcium sulfate, the passage of said solution through the resin bed being for a superficial contact time which is less than the time for significant precipitation of calcium sulfate to occur within the resin bed, adding methanol to the effluent from the resin bed to precipitate calcium sulfate, filtering the solution to remove the precipitate, adding the filtrate to methanol to precipitate streptomycin sulfate, filtering the solution to remove streptomycin sulfate, and drying the filtrate cake.

7. The process of producing anhydrous dihydrostreptomycin sulfate which comprises passing an aqueous solution of streptomycin calcium chloride complex through a column of a strongly basic anion exchange resin on the sulfate cycle, thereby replacing the chloride ions in the solutions with sulfate ions and creating a condition of supersaturation in the solution with respect to calcium sulfate, the passage of said solution through the resin bed being for a superficial contact time which is less than the time for significant precipitation of calcium sulfate to occur within the resin bed, hydrogenating the effluent from the resin bed to convert the streptomycin sulfate in the effluent to dihydrostreptomycin sulfate, adding methanol to the solution to precipitate calcium sulfate, filtering the solution to remove the precipitate, treating the filtrate with methanol to precipitate dihydrostreptomycin sulfate, filtering the solution to remove dihydrostreptomycin sulfate and drying the filtrate cake.

8. The process which comprises maintaining an aqueous solution of streptomycin calcium chloride complex in contact with an anion exchange resin on the sulfate cycle for a superficial contact time which is insufficient to result in precipitation of calcium sulfate within the resin bed, immediately removing the resin-treated solution containing streptomycin sulfate and calcium sulfate from contact within the resin, mixing a portion of the resin-treated solution with additional streptomycin calcium chloride complex outside of the resin bed, thereby causing calcium sulfate to precipitate, filtering the last mentioned solution to remove the precipitate, maintaining the filtrate in contact with an anion exchange resin on the sulfate cycle for a superficial contact time which is insufficient to result in precipitation of calcium sulfate within the resin bed, and immediately removing the last mentioned resin-treated solution, containing streptomycin sulfate and calcium sulfate, from contact with the resin.

9. The process of producing an aqueous solution of streptomycin sulfate which comprises preparing an aqueous solution of streptomycin calcium chloride complex, feeding such solution to the top of a bed of an anion exchange resin on the sulfate cycle, maintaining the flow rate of the solution through the resin bed substantially uniform at a level where calcium sulfate does not precipitate within the resin bed, recovering the effluent in separate cuts, including a rich cut containing streptomycin sulfate in aqueous solution substantially free of chloride ions and a mixed cut containing a mixture of the chlorides and sulfates of streptomycin and calcium, mixing the mixed cut with additional streptomycin calcium chloride complex to prepare additional feed solution for the resin, filtering the additional feed solution to remove the precipitated calcium sulfate, feeding the filtrate to the top of the resin bed in a succeeding run, maintaining the flow rate of the solution through the resin bed as in the first mentioned run, and recovering the effluent in separate cuts as in the first mentioned run.

10. The process as defined in claim 9 in which the anion exchange resin is strongly basic, and the concentration of the solutions fed to the top of the resin bed is at least 100,000 units of streptomycin base per milliliter.

11. The process as defined in claim 9 in which the anion exchange resin is strongly basic, the concentration of the solutions fed to the top of the resin bed is at least 100,000 units of streptomycin base per milliliter, and the superficial contact time of each solution with the resin is from about 25 to about 50 minutes.

12. The process of producing anhydrous streptomycin sulfate which comprises preparing an aqueous solution of streptomycin calcium chloride complex having a concentration of at least 200,000 units of streptomycin base per milliliter, introducing such solution as feed to the top of a bed of a strongly basic anion exchange resin on the sulfate cycle, thereby replacing the chloride ions in the solution with sulfate ions and creating a condition of supersaturation in the solution with respect to calcium sulfate, maintaining the flow of the solution through the resin at such rate that the superficial contact time of the solution with the resin is not more than 60 minutes, whereby calcium sulfate does not precipitate within the resin bed, recovering the effluent in separate cuts, including a rich cut containing streptomycin sulfate in aqueous solution substantially free of chloride ions and a mixed cut containing a mixture of the chlorides and sulfates of streptomycin and calcium, adding methanol to the rich cut to precipitate calcium sulfate, filtering the rich cut to remove the precipitate, adding the rich cut filtrate to methanol to precipitate streptomycin sulfate, filtering the methanol solution to remove streptomycin sulfate, drying the filter cake to yield anhydrous streptomycin sulfate, mixing the mixed cut with additional streptomycin calcium chloride complex to form a new solution, outside of the resin bed, having a concentration of at least 200,000 units of streptomycin base per milliliter, filtering the new solution to remove the calcium sulfate precipitated therein, and repeating the process as described using as feed to the top of the resin bed the filtrate of the new solution.

13. The process of producing anhydrous dihydrostreptomycin sulfate which comprises preparing an aqueous solution of streptomycin calcium chloride complex having a concentration of at least 200,000 units per streptomycin base per milliliter, introducing such solution as feed to the top of a bed of a strongly basic anion exchange resin on the sulfate cycle, thereby replacing the chloride ions in the solution with sulfate ions and creating a condition of supersaturation in the solution with respect to calcium sulfate, maintaining the flow of the solution through the resin at such rate that the superficial contact time of the solution with the bed is not more than 60 minutes, whereby calcium sulfate does not precipitate within the resin bed, recovering the effluent in separate cuts, including a rich cut containing streptomycin sulfate in aqueous solution substantially free of chloride ions and a mixed cut containing a mixture of the chlorides and sulfates of streptomycin and calcium, hydrogenating the rich cut to convert the streptomycin sulfate therein to dihydrostreptomycin sulfate, adding methanol to the hydrogenated rich cut to precipitate calcium sulfate, filtering the hydrogenated rich cut to remove the precipitate, treating the hydrogenated rich cut filtrate with methanol to precipitate dihydrostreptomycin sulfate, filtering the methanol solution to remove dihydrostreptomycin sulfate, drying the filter cake to yield anhydrous dihydrostreptomycin sulfate, mixing the mixed cut with additional streptomycin calcium chloride complex to form a new solution, outside of the resin bed, having a concentration of at least 200,000 units of streptomycin base per milliliter, filtering the new solution to remove the calcium sulfate precipitated therein, and repeating the process as described using as feed to the top of the resin bed the filtrate of the new solution.

14. In the process of making streptomycin sulfate from streptomycin calcium chloride complex, the step which comprises contacting said streptomycin calcium chloride complex in aqueous solution with streptomycin sulfate, thereby precipitating a substantial amount of the calcium as calcium sulfate without introducing a significant amount of non-sulfate ions into the solution.

15. The process of claim 14 wherein the step described is followed by filtering the solution to remove the precipitated calcium sulfate, and then treating the filtrate to convert the streptomycin trihydrochloride contained therein to streptomycin sulfate.

16. The process of claim 14 wherein the step described is followed by filtering the solution to remove the precipitated calcium sulfate, and then passing the filtrate through an anion exchange resin on the sulfate cycle to convert the streptomycin trihydrochloride contained in the filtrate to streptomycin sulfate.

17. The process of claim 14 wherein the step described is followed by filtering the solution to remove the precipitated calcium sulfate, passing the filtrate through an anion exchange resin on the sulfate cycle to convert the streptomycin trihydrochloride contained in the filtrate to streptomycin sulfate, recovering the effluent from the resin in separate cuts, including a rich cut containing streptomycin sulfate in aqueous solution substantially free of chloride ions and a mixed cut containing a mixture of the chlorides and sulfate of streptomycin and calcium, and employing the mixed cut as a source of streptomycin sulfate for precipitating calcium sulfate in a subsequent run of the claimed process.

References Cited in the file of this patent

UNITED STATES PATENTS

| | | |
|---|---|---|
| 2,680,736 | Preud'Homme | June 8, 1954 |
| 2,683,142 | Wolf | July 6, 1954 |